United States Patent Office 2,858,596
Patented Nov. 4, 1958

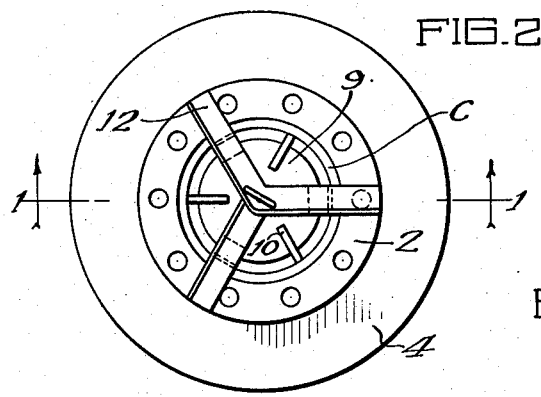
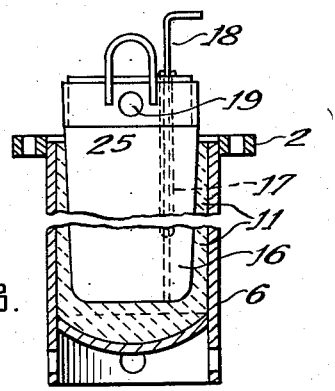
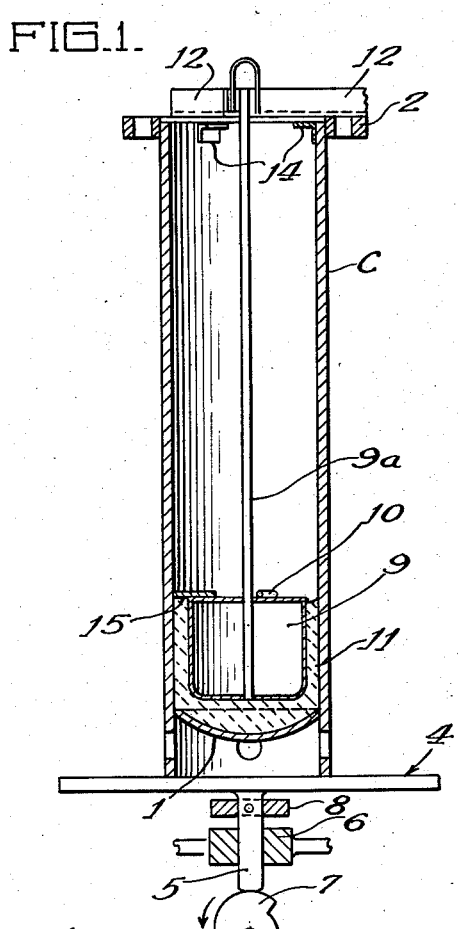
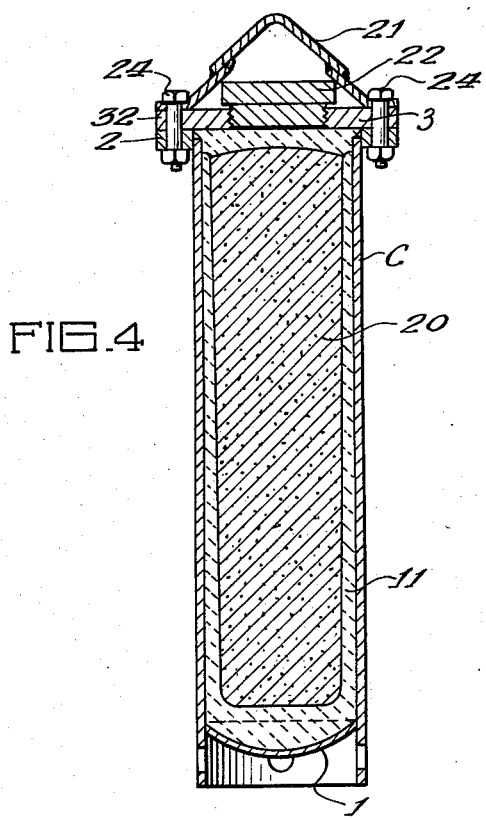

2,858,596

CRUCIBLE LINING METHOD

Walter H. Bone, Pine Lawn, and Walter W. Schmidt, St. Louis County, Mo., assignors to the United States of America as represented by the United States Atomic Energy Commission Application December 11, 1945, Serial No. 634,313

5 Claims. (Cl. 25—155.5)

The present invention relates to the production and treatment of uranium and similar metals, and particularly to a novel method of forming a lining for a crucible or reaction chamber for the production of uranium in massive form.

In the manufacture of uranium, it has been proposed to reduce finely divided uranium tetrafluoride ($UF_4$) to uranium metal by reacting the fluoride with powdered calcium (Ca) or magnesium (Mg) in a closed crucible or bomb by externally heating the bomb containing these materials, as reactants, until an exothermic reaction reduces the fluoride to the metal. The metal is separated from other reaction products by gravity, and is collected in the lower portion of the bomb. Great difficulty has been experienced in providing suitable inert refractory linings for the crucible or bomb in which the process is carried out. In order to start the reaction of the fluoride with the calcium or magnesium, it is necessary that the reactants be heated uniformly. If thin spots are produced in the crucible lining, the yield of uranium metal is greatly decreased because the reaction starts before the entire mass of the reactants is at optimum temperature, resulting in the loss of uranium due to the formation of the uranium in small particles rather than in massive form. The prevention of thin spots requires a lining which is substantially uniform in heat transmission. The temperature of reaction is quite high, being analogous to that developed in the well-known thermite process, and it is necessary that the crucible lining have uniform heat transmission properties in the outward direction to prevent the development of hot spots during the reaction which might cause destruction not only of the lining and contamination of the metal, but also of the crucible.

The requirements for high purity in the crucible lining are extremely exacting. For example, in crucibles having calcined calcium oxide as a lining, the water and other impurity content must be extremely low to prevent contamination of the uranium and to prevent the formation of products that might cause destruction of the crucible either by direct attack on the calcium oxide or by actual burning-through of the crucible under the extreme heat developed by the reaction. Consquently, in preparing the refractory linings for such crucibles, it is very undesirable and often dangerous to mix binders or other viscous media with the calcium oxide, to render the lining self-sustaining, prior to introduction of the reactant mixture.

In the manufacture of uranium by reduction of uranium fluoride in a lined iron crucible, the lining of the crucible is used only once and is replaced following each reduction, whereas it is very desirable to use the metal crucible time after time. Any failure of the crucible lining, such as by formation of cracks or breaking away of portions thereof, allows the reactants to penetrate into contact with the iron crucible, resulting in pitting of the inner wall. Actual puncturing or failure of the crucible may occur under such pitting conditions when the pitting is sufficiently deep to allow penetration of the reactants or products. When this occurs, the high temperature reactants are blown at high velocity through the crucible at the point of crucible failure. Such failure produces a very dangerous condition with respect to operating personnel.

Thus, it has been found that without the use of binders or the like, only a few of the prepared lined crucibles could be used; and of those suitable for use, the number destroyed during the process has been excessive. For example, in certain runs, iron crucibles lined with tamped calcium oxide without binders generally failed after being used only three times, and even then the uranium yield based on the quantity of uranium in the fluoride was lower than desired, and the resulting uranium metal contained an excessive percentage of iron due to pitting of the iron crucible.

The principal object of the present invention is to provide suitable refractory linings for crucibles for the production of uranium and similar metals.

A further object of the invention is to provide a crucible for obtaining uranium and similar metals by an exothermic reaction which is not subject to failure during use and which will increase the yield of metal.

A still further object is to provide an improved method of forming refractory crucible linings for uranium and similar metal production that will withstand the high temperatures of the exothermic reaction, which method is rapid and of low cost.

The above and other objects, features and advantages of the invention will become readily apparent to those skilled in the art when taken in connection with the following description and the accompanying drawing wherein:

Fig. 1 is a vertical central cross-sectional view, partly in elevation, on the line 1—1 of Fig. 2 of a partially lined crucible and its support;

Fig. 2 is a top plan view of the crucible and the preliminary liner core form shown in Fig. 1;

Fig. 3 is a view similar to Fig. 1 showing the preliminary liner core form shown in Fig. 1;

Fig. 3 is a view similar to Fig. 1 showing the preliminary core form replaced by the final core form; and Fig. 4 is a similar view to Fig. 1 showing the completely lined crucible containing a reactant charge and having a top thereon.

In accordance with the invention, a powdered refractory, such as calcined calcium oxide, is used as a crucible lining material, and the oxide is packed by mechanically jolting the crucible during the formation of the lining in order to provide a dense cohering mass of the oxide without the addition of any binding materials whatsoever. Thus, no deleterious matter that might combine with or otherwise contaminate the reactant charge or the resultant uranium formed by the exothermic reaction produced in the crucible is added to the lining. In addition, a lining made in accordance with the invention is so uniformly dense that no burning out or pitting of the crucible occurs and the uranium produced is of higher purity and the yield is higher than heretofore obtained.

Jolting of the calcium oxide produces a compact mass and a highly satisfactory lining wherein pitting of the iron crucible is practically eliminated, whereas compressive tamping and otherwise compacting of the oxide by means other than the jolting result in unsatisfactory linings. For example, compressing the oxide by tamping, while producing a lining which will maintain its shape until the reactants are placed in the crucible, results in very high iron contamination of the uranium and in frequent failure of the lining and destruction of the crucible. From tests on crucibles having linings prepared by different methods, it has been found that for calcium oxide linings made by compressing the oxide by tamping, the iron crucibles could be used, on an average, only three times because of penetration by the reactants. In addition, the contamination of the uranium by iron from the crucible was exceedingly high, of 140 to 150 parts per million. However, by following the teachings of the present invention, it is possible to reduce the iron contamination to about 57 p. p. m. and the pitting of the iron crucibles is reduced to only rare occurrences.

For a more complete understanding of the invention reference may be had to the drawing wherein is shown a crucible C, preferably of iron or steel and elongated in shape. The crucibles which have been used with particular success are constructed of pipe approximately six inches in diameter and 36 inches long to which there is welded a concave bottom member 1 interiorly of the pipe at the lower end or base. An outwardly extending flange 2 is provided at the other open end to which cap 3 (Fig. 4) may be clamped or otherwise affixed. The crucible C is placed on a jolting table 4 shown schematically in Fig. 1. The table 4 is provided with an arbor 5 guided by a bearing 6 and movable in an upward direction by a cam 7. Upon each revolution of the cam, the table and the crucible supported thereby fall by gravity to a solid stop provided by an adjustable collar 8 engaging the top of the bearing 6. The crucible bottom 1 does not contact the table and the jar is distributed evenly through the length of the crucible. One particularly suitable jolting table was adjusted to have a stroke of 1⅜ inches and a jolting rate of 250 per minute.

The method of lining the crucible will now be described in detail. A small quantity of the calcium oxide is placed in the crucible C to cover the bottom thereof sufficiently to provide a thickness, when compacted by jolting, substantially equal to the desired lining thickness along the crucible side wall. The calcium oxide in the bottom of the crucible is then compacted as hereinafter described, and a preliminary core or form 9 of wood, steel, chromium-plated steel, or other material and of circular cross section is then inserted into and positioned centrally of the crucible C.

In order to accurately form the crucible lining, the preliminary core 9 is of lesser length than the depth of the crucible C and is provided with lugs 10 which center it coaxially in the crucible through contact with the interior crucible wall. A supporting rod 9a extends axially upward from the core 9 and is itself supported by radially extending arms 12 that rest on the crucible lip or flange 2. The upper end of the rod 9a is centered coaxially in the crucible by a second set of positioning lugs 14 depending from the support arms 12. The preferred lining thickness determines the diameter of the form 9. The form may be provided with a slight downward taper so that it may be removed more readily.

As the next step in forming the lining, additional calcium oxide is poured into the space between the form 9 and the crucible C. The jolting table 4 on which the crucible is supported is started and the calcium oxide is subjected to the jolting thereof for a period of 10 to 15 minutes. Jolting causes the oxide to settle, and additional oxide is introduced into the crucible during the jolting until the compacted material forms the lower portion of a liner 11 to the approximate height indicated by numeral 15 in Fig. 1.

The preliminary form 9 is then replaced by a full length core or form 16, the lower end of which snugly fits the lower portion of the liner 11 previously formed with the preliminary core 9. The form 16 is preferably of well-seasoned wood, highly polished, and is a solid member. For the size and form of the crucible referred to, the jolting produces a compacting of the lining material so that approximately 20 percent more calcium oxide is utilized than can be compacted by mere compression of the oxide in the crucible by tamping or other methods. With the jolting method described, it is possible to increase the amount of calcium oxide from 18 to 22 pounds for a given lining thickness in the crucible described, thus resulting in a considerable increase in the compactness of the lining material.

When the liner 11 is built up by the jolting of the material in situ to a height indicated by numeral 25, approximately one half inch from the flange portion 2, the prepared crucible may be removed from the jolting table and the form 16 removed. The removal of the form 16 may be facilitated by providing a transverse hole 19 through the upper end of the form 16, through which a rod or other member may be passed so that the form may be slightly rotated while being pulled upwardly, the slight taper on the form facilitating its removal. A hole 17 extends longitudinally through the core form throughout its entire length to allow air to fill the space below the form during its removal from the crucible. A removable rod 18 fills the hole 17 at the time when the calcium oxide is being poured into the crucible.

As shown in Fig. 4, a charge 20 may be introduced into the lined crucible without further treating the lining 11 in any way. Thus, no baking, sintering, or other treatment is necessary, other than the jolting, to provide a well compacted and self-sustaining lining.

The charge 20 comprises an intimate mixture of powdered calcium or magnesium and uranium tetrafluoride, preferably with a slight excess of calcium or magnesium, such as 10 percent, over the stoichiometric proportions. The charge has been prepared by placing the materials, in a quantity sufficient for one charge, in a rotary mixer to assure thorough mixing of the calcium or magnesium with the fluoride and to break up aggregates. The charge is then immediately placed in the crucible, the quantity being insufficient to extend above the height of the upper boundary 25 of the lined portion of the crucible. The crucible is then filled with additional calcined calcium oxide, which is packed by light tamping over the upper boundaries 25 of the lining 11 and over the charge 20 to completely fill the crucible.

As stated, the lining 11 is not initially built to the top of the crucible C but is terminated at point 25. The reactant charge does not completely fill the lined cavity so that, when the additional calcium oxide is introduced into the crucible, the upper boundary of the charge 20 is below the level of contact between the capping material and the lining 11. It is preferable to provide the lining of insufficient extent to completely cover the wall of the crucible, and to leave the wall clear of lining by an amount slightly less than the lining thickness. In addition, the upper boundary of the charge is made at about a distance equal to the lining thickness from the open end of the crucible so that the thickness of the capped portion is substantially equal to the thickness of the lining 11. This allows more uniform heat exchange between the reactants and the crucible during the external heating and the exothermic reaction steps.

The cap member 3, provided with a flange corresponding to the flange 2 of the crucible, is placed over the open end of the crucible and, together with a lifting bracket 21, is clamped thereto by bolts and nuts 24, but it is not sealed, in order that gas or volatile materials may escape from the crucible. To this end, the cap 3 is drilled and tapped to receive a pipe plug 22 that may be manually screwed therein to a tightness or looseness permitting the desired freedom for escaping gases above a maximum pressure. The charge is then ready for the reaction producing the uranium metal in massive form.

The closed crucible is placed in a furnace and heated at a temperature of approximately 600° C. to initiate the exothermic reaction within the crucible. The exothermic reaction releases considerable heat and raises the temperature not only of the lining 11, but also of the crucible C, so that further heating from an external source, such as the furnace referred to above, is unnecessary once the reaction has been initiated. Following the reaction, the crucible is removed from the furnace and allowed to cool to the handling temperature. When using magnesium as one of the reactants, the reaction with uranium tetrafluoride to form magnesium fluoride and uranium may be represented by the following equation:

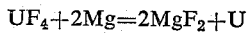

This reaction develops considerable heat as indicated above, and with a tamped crucible lining, the heating thereof is non-uniform because of unequal heat flow to the crucible C resulting in hot spots and lining failure. Such lining failures exposes the iron crucible to the high temperature reactants which attack the iron and cause severe crucible pitting or actual penetration and destruction of the crucible.

Following the reaction and cooling of the crucible, the crucible is opened and the upper calcium oxide lining portion chipped away, whereupon the reduced uranium metal, covered with a layer of slag, is found in the bottom of the crucible and removed. The lining 11 is then chipped away from the crucible walls and the crucible is cleaned. Following cleaning of the crucible, it may be relined in the manner described above, refilled with the reactants and used again, since, when following the teachings of this invention, no material pitting of the metal crucible occurs.

As has been previously mentioned the calcium oxide must be dry, as the presence of moisture therein may cause difficulty in obtaining the desired reaction. It appears that the presence of moisture is conducive to a water-regenerative cycle in the calcium oxide lining of the crucible. Water reacts with uranium tetrafluoride to form uranium oxide and hydrogen fluoride, which latter reacts with calcium oxide to form calcium fluoride and water. Such a reaction may be represented by the equation:

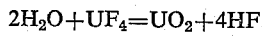

Some of the water may be reduced by the magnesium to form magnesium oxide with evolution of hydrogen, which latter can escape through the joint between the flanges since a sealed joint is not provided and the lining is sufficiently porous to allow diffusion of the hydrogen therethrough. However, even with very small amounts of water present, uranium oxide is produced rather than the metal itself, with consequent reduction in uranium yield. Thus, as indicated above, it is of great importance that the lining contains little or no water or water-containing binders, and this is readily accomplished when such linings are made in accordance with the present invention.

While the invention has been described with particular reference to calcined calcium oxide used as a lining, it is obvious that other powdered materials, such as fused calcium oxide, calcined or fused dolomite, or other refractory materials, may be used. Furthermore, it will be appreciated that other changes and modifications of the invention will at once suggest themselves to those skilled in the art and that the invention is not limited to the particular example described nor to the other features and modifications thereof set forth, except as required by the appended claims.

What is claimed is:

1. A method of forming a dense, compact refractory lining in a reaction chamber comprising the steps of supporting a preliminary form within said chamber and in predetermined spaced relationship with said chamber walls by radial protrusions of said form abutting against the chamber, introducing a powdered refractory material without binder between said form and said chamber walls to a level below said protrusions, jolting said chamber, preliminary form and material until a compact partial lining of said material is produced, replacing said preliminary form with a final form without disturbing said partial lining, introducing additional powdered refractory material without binder between said final form and said chamber walls, and jolting said chamber, final form and material until a compact complete lining is produced.

2. In the process of forming in a crucible an elongated liner from powdered refractory material, the improvement which comprises inserting in the crucible a preliminary form having spacing lugs adjacent its lower end so arranged as to exactly center said end of the preliminary form in the crucible, forming a partial compact liner of powdered refractory material to a point lower than said spacing lugs, removing the preliminary form, and inserting a second form exactly centered by means of the partial lining already formed, and forming the remainder of the lining of powdered refractory material.

3. In the process of forming an elongated crucible liner by inserting into an elongated crucible a form suspended in spaced relation to the side-walls and bottom of the crucible, and compacting a dry powdered refractory material into the space between said form and said side-walls and bottom by jolting the crucible material and form together while inserting said material, and thereafter removing said form: the improvement which comprises the steps of first inserting a preliminary form having a bottom contour identical with the bottom contour of the first-mentioned form, but having radial lugs extending to said side-walls to center the preliminary form, compacting said material into the space so formed to a level lower than the lugs to form the bottom of the liner by jolting the crucible material and preliminary form while inserting said material, withdrawing the preliminary form, and inserting the bottom of the first-mentioned form into the liner bottom so formed.

4. In the process of forming an elongated crucible liner by inserting into an elongated crucible a form suspended in spaced relation to the side-walls and bottom of the crucible, and compacting a dry powdered refractory material into the space between said form and said side-walls and bottom, and thereafter removing said form: the improvement which comprises the steps of first inserting a preliminary form having a bottom contour identical with the bottom contour of the first-mentioned form, but having radial lugs extending to said side-walls in a plane intermediate between the bottom and top of the crucible to center the preliminary form, compacting dry powdered refractory material into the space so formed to a level lower than said plane to form the bottom of the liner, withdrawing the preliminary form, and inserting the bottom of the first-mentioned form into the liner bottom so formed.

5. In the process of forming an elongated crucible liner by inserting into an elongated crucible a form suspended in spaced relation to the side-walls and bottom of the crucible, and compacting a refractory material into the space between said form and said side-walls and bottom, and thereafter removing said form: the improvement which comprises the steps of first inserting a preliminary form having a bottom contour identical with the bottom contour of the first-mentioned form, but having radially extending lugs abutting against said side-walls to position the preliminary form, compacting refractory material into the space so formed to a level lower than the lugs to form the bottom of the liner, withdrawing the preliminary form, and inserting the bottom of the first-mentioned form into the liner bottom so formed.

References Cited in the file of this patent

UNITED STATES PATENTS

| | | |
|---|---|---|
| Re. 22,050 | Crespi | Mar. 24, 1942 |
| 750,468 | Lee | Jan. 26, 1904 |
| 833,595 | Gannett et al. | Oct. 16, 1906 |
| 967,030 | McAdam | Aug. 9, 1910 |
| 1,072,495 | Priest | Sept. 9, 1913 |
| 1,515,057 | Ledyard et al. | Nov. 11, 1924 |
| 2,311,358 | Baily | Feb. 16, 1943 |